Oct. 16, 1962
L. MAIOCCHI
3,058,509
PNEUMATIC VEHICLE WHEEL TIRE
Filed June 29, 1959
2 Sheets-Sheet 1
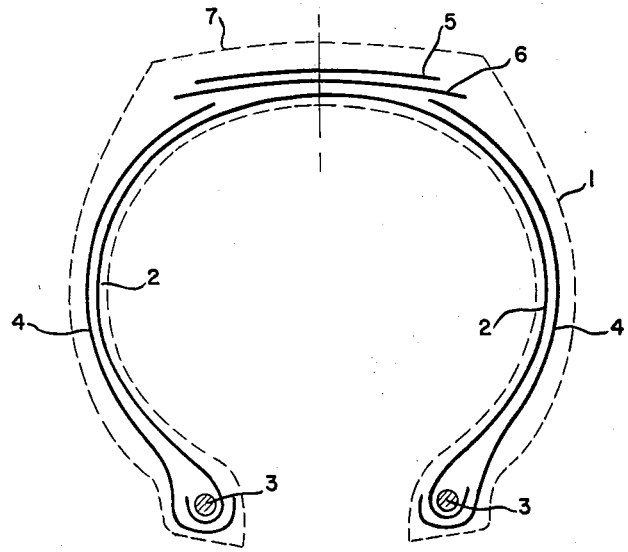
FIG.I.
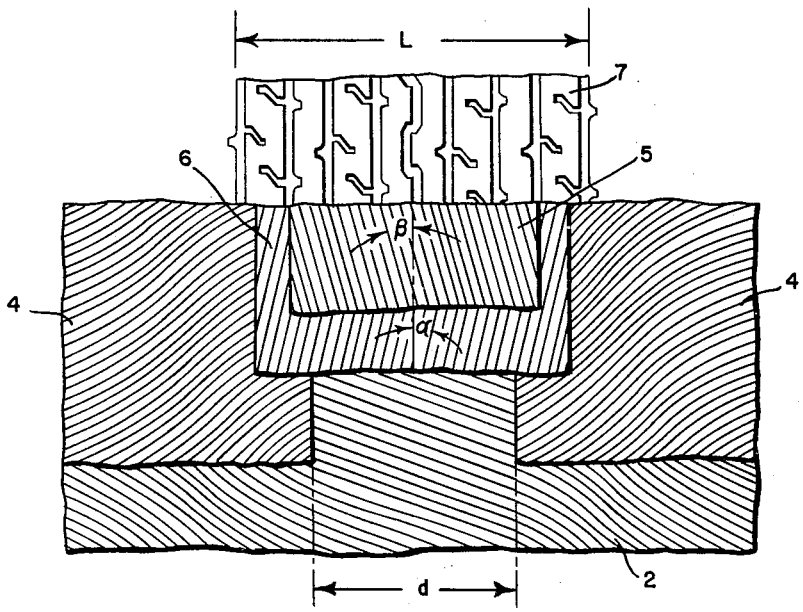
FIG.2.
INVENTOR
Luigi Maiocchi
BY *Stevens, Davis, Miller & Mosher*
ATTORNEYS Oct. 16, 1962 L. MAIOCCHI 3,058,509
PNEUMATIC VEHICLE WHEEL TIRE
Filed June 29, 1959 2 Sheets-Sheet 2
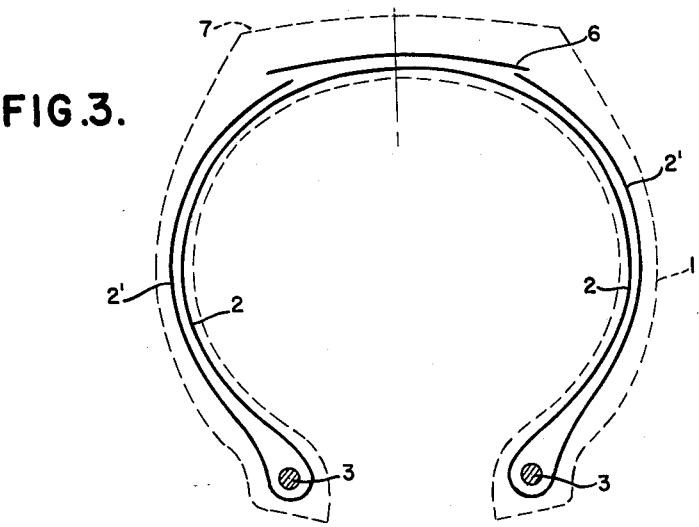
FIG.3.
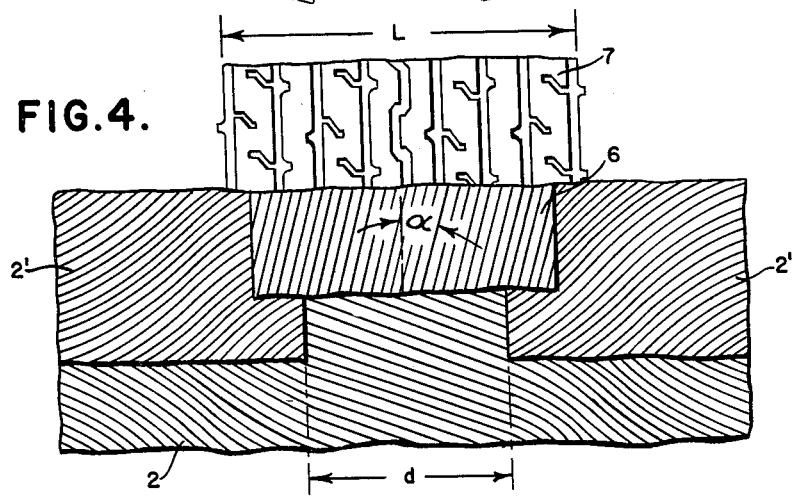
FIG.4.
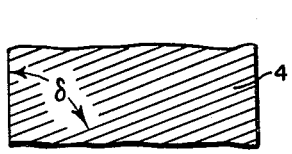
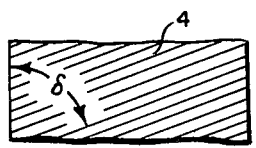
FIG.5.
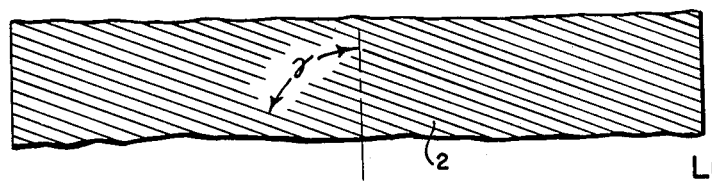
INVENTOR
Luigi Maiocchi
BY Stevens, Davis, Miller & Mosher
ATTORNEYS

United States Patent Office 3,058,509
Patented Oct. 16, 1962

3,058,509
PNEUMATIC VEHICLE WHEEL TIRE
Luigi Maiocchi, Milan, Italy, assignor to Pirelli S.p.A., Milan, Italy
Filed June 29, 1959, Ser. No. 823,746
Claims priority, application Italy July 29, 1958
6 Claims. (Cl. 152—356)

The present invention, as will hereinafter more fully appear, relates to a new type of pneumatic tire involving the combination of a substantially inextensible reinforcing structure or "cincture" (located between the tread and the carcass plies) and a carcass structure in which the carcass plies are oriented in a "so-called" geodetical disposition. More particularly this invention pertains to improvements over the invention disclosed and claimed in my copending application Serial No. 799,955, filed on March 17, 1959, and entitled Pneumatic Vehicle Wheel Tire.

The aforementioned copending application discloses a pneumatic tire characterized by a particular carcass structure consisting of a central portion in which the cords have a geodetical disposition along a single non-radial direction and of two lateral portions comprising the bead and sidewall areas, in which the cords form a crossed structure. The lateral portions extend from the beads for a length which reaches at least the zone of maximum width of the tire and which may extend as far as the zone below the tread, and, at any event, leaving a gap between the ends of the lateral portions not smaller than one third of the tread width.

The carcass structure of the prior application can be obtained either (1) by using a ply cut on the bias extending from one bead to the other together with two strips, also cut on the bias at an angle opposite to that of the ply, each extending from one bead to the zone of the corresponding sidewall within the above indicated limits, or (2) by using a single ply of greater width, cut on the bias and turned about the bead wires with the turned edges extending into the sidewalls, still within the said limits.

When the carcass is composed of several wide plies (without the separate strips), the cords of each ply are inclined at the same angle and in the same direction and likewise the cords of the turned edges are all parallel to one another and situated according to an angle equal and symmetrical to that of the main portion of the ply. However, when the separate strips are used (with the narrower plies), they can be provided in a number different from that of the plies and/or have an opposite angle also different from that of said plies.

The construction of the carcass forming the object of the prior application can be carried out in a very simple way with a conventional tire building drum using conventional processes, and by utilizing the variation of the cord angles which occurs during the shaping operation in consequence of the passage from the cylindrical to the toroidal form.

The prior application finally provides that conventional breakers, in one or more layers, can be applied to the carcass.

On the other hand, the present invention, as its principal object, aims at extending the use of the carcass of the type disclosed in the prior application to a pneumatic tire provided with a reinforcing structure of the so-called "cincture" type, namely a reinforcement resistant to tension stresses and placed under tension by the inflation pressure of the tire.

A further object of the present invention is to employ a particular geodetical carcass (of the type referred to above) in combination with a reinforcing structure of the "cincture" type so as to produce a resulting pneumatic tire which, as compared with tires previously known, provides (a) a considerable improvement in travelling comfort, (b) better road traction, and (c) a reduction in noise.

A still further object of the present invention is to provide a simplified cincture structure whose employment is made possible by the particular structure of the carcass constructed in accordance with the prior application.

Moreover, according to particular embodiments of the present invention, the cincture structure can be further simplified and the carcass can be constructed so as to give the tire improved characteristics.

The recognized purpose of the above-described cincture structures is to maintain the peripheral development of the tire unvaried under load and, consequently, to avoid the compression of the tire in the zones where is contacts the ground. Thus, the cincture structure also minimizes resultant creeping, which is one of the main causes of wear of the tread. However, in order that the cincture structure may exert this function without impairing the life of the tire, it is necessary for the underlying carcass to be such as not to interfere with the movements of the cincture structure when the tire is squeezed against the ground in consequtnce of the load.

For the purpose of achieving the proper coaction between the cincture structure and the underlying carcass, a carcass of the radial type has been employed heretofore. It is also possible to use a modified crossed carcass providing that the same behaves in substantially the same manner as a radial carcass. In this way it is possible to select a combination of cincture and carcass so as to obtain a pneumatic tire essentially characterized by a longer life and having greater road traction than the conventional tires.

The radial carcass, however, does not ensure a perfect lateral stability, particularly when the vehicle is running on a curve and a high speed; also, the radial carcass makes the tire generally noisy.

On the other hand, a crossed carcass of the type suitable for use in combination with a cincture structure has a very complicated and/or expensive construction, and moreover, causes a certain rigidity in the tire.

In accordance with the present invention, it has been found that the geodetical carcass described in the aforementioned copending application can be employed even more advantageously in combination with a reinforcing structure of the "cincture" type.

This geodetical carcass allows a certain freedom of movement to the cincture structure by reason of the high angle which the cords assume at the top, where they are disposed along a single direction, and on account of the fact that, at the shoulders, namely, in proximity of the extremities of the lateral strips (or turned edges), the cords of the various layers of fabric, though being still crossed, are tied in a very moderate way. The ties of the crossed cords become stronger in descending towards the beads, thus ensuring a useful rigidity in the proximity of the beads as well as a sufficient resistance to the transversal stresses in the sidewall portions.

In order to avoid any possibility of detachment or rupture in the carcass plies, it is preferable that the lateral strips (or turned edges) be extended as far as a zone below the cincture structure, and always in such a manner that the width or the gap between their opposed edges is not smaller than ⅓ of the total width of the tread (since the cincture structure has a width generally equal to, or somewhat smaller than, that of the tread).

The cincture structure can be of any suitable type whatever and, therefore, can be chosen from those acceptable types already proposed. However it should be mentioned that the particular structure of the carcass, whose cords at the top are all disposed along a single geodetical direction and inclined for an angle relatively great with respect to the mid-circumferential plane of the tire, makes possible the adoption of a cincture structure of simplified construction. In fact, it is possible to use a cincture structure formed of a single layer of cords disposed along a single direction inclined in a direction opposite to that of the carcass cords in the central portion and forming a small angle with respect to the mid-circumferential plane.

The cincture structure, besides exerting a belting action on the tire, also equalizes the stresses in the tire structure, thus balancing the component of transversal dissymmetry due to the fact that, as described above, the carcass cords are all inclined in a single direction. This symmetrizing action is rendered possible by situating the cincture structure inclined with respect to the mid-circumferential plane, in a direction opposite to that of the carcass and at an angle which may be determined by the angle of the carcass cords as modified by the ratio between the elastic modulus of the cincture structure and that of the carcass cords. The angle of the cincture structure has, in general, a value lower than 20°.

In the above manner, the small dissymmetry of the two structures is balanced. At the same time, because of the small inclination of the cincture structure, the latter is able to exert the desired belting action.

When it is necessary, in consequence of the service for which the tire is intended, to make the cincture structure with more than one layer of cords, these cords can be all disposed along a single direction. However, the same result can be obtained by using at least two layers of cords inclined with respect to each other and forming different and opposite angles with respect to the mid-circumferential plane, such as to have a resulting component capable of symmetrizing the carcass structure.

As indicated heretofore, a pneumatic tire constructed in accordance with the present invention will exhibit the characteristics of being noiseless, of being easy to drive, and of being comfortable during travelling. It has been discovered that these features can be still further improved in a surprising way by adopting such a cutting angle in the plies forming the carcass that, in portion of maximum width in the finished tire, the cords of the carcass plies cross one another at equal and symmetrical angles ranging bejtween 65° and 80°. In other words, if a cylindrical surface parallel to the rotational axis of the tire were passed through the tire in the zone of its maximum width, the locus of the points of intersection of the carcass plies with this cylindrical surface would approximate two circles at the opposite sides of the tire; the angles referred to above would be the angles formed between the cords and the tangents to the circles at the various points of intersection.

During the shaping operation in which the structure changes from the cylindrical shape of the drum to the toroidal shape approximating the shape of the completed tire, there is a variation in the angular orientation of the carcass cords with respect to the tangents to the parallel circles corresponding to the various diameters of the tire. A further slight variation of the inclination of the carcass cords occurs during the molding and vulcanizing steps in consequence of the expansion which takes place in the tire. In the points in which the section of the finished tire has the maximum width, the carcass cords meet the tangents of the parallel circles corresponding to said points at an inclination nearly equal to, or at the most greater by a few degrees, than the cutting angle of the plies forming the carcass itself. Therefore, in order to obtain the above indicated construction, the ply or plies and the strips (if employed) forming the carcass will be cut at an angle having a value ranging between 60° and 75°. The cutting angle of the plies, and consequently the inclination of the carcass cords in the points of maximum width of the finished tire, can be varied within the above indicated limits, in accordance with the structural characteristics (size and shape) of the tire, the material used for the carcass and/or for the cincture structure, the inflation pressure and the service conditions of the tire.

Also on the basis of comparative tests carried out, the improvement in the tire characteristics, as afforded by the present invention, can be attributed to the following reasons:

(1) In a carcass of the radial type, the vibrations imparted to the cords by impact against obstacles of small size and/or at low speed are transmitted from the cords directly to the rim and from this to the vehicle. Moreover, when the radial carcass is provided with a cincture structure, the noisy effect is further enhanced by the fact that the cincture structure propagates, along its length, the vibrations which are then transmitted to the underlying carcass cords. However the radial carcass does exhibit an advantageous behavior in the case of impacts against larger obstacles and/or at high speed because, owing to the low rigidity of the cincture structure, the impact is exerted on the underlying carcass which, on account of the particular disposition of its cords, deforms in correspondence with the obstacle and thus absorbs the shock.

(2) In a pneumatic tire in which a cincture structure is situated over a crossed carcass of the conventional type, there would be a behavior opposite to that described above with reference to a carcass of the radial type; that is, the many crossing points of the cords in the crossed carcass would absorb the vibrations so as to reduce the noise during impact against a small obstacle and/or at low speed. On the other hand, as the cincture structure would be stiffened by the action of the crossed structure of the carcass, the driving would be fairly noisy in the case of impacts against larger obstacles and/or at high speed. Also, the latter construction would not give practical results because, under service, the carcass would tend to oppose to the movements of the cincture structure, thus causing considerable stresses which would result in a quick destruction of the tire.

(3) The tire of the present invention includes the advantageous characteristics of the tire provided with a radial carcass and a cincture structure in combination with the advantages which a tire provided with a conventional crossed carcass and a cincture structure could give (if the latter could be practically employed). In fact, the vibrations imparted to the carcass cords by impact against small obstacles and/or at low speed are soon absorbed, being reflected and refracted at the crossing points of the cords so that the cincture structure is essentially unaffected at those points which are removed a short distance from the zone of contact with the obstacle. During impact against larger obstacles and/or at high speed, the present carcass, which is more flexible than the crossed or conventional carcasses, is readily deformed once the obstacle has overcome the low rigidity of the cincture structure, thus absorbing the shock and eliminating the noise.

The invention will now be described in detail, with reference to the attached drawings, included by way of non-limiting example, which illustrate certain embodiments of the invention itself.

FIGURE 1 is a diagrammatic sectional view of a tire casing constructed according to the present invention wherein the carcass is made of one ply and two lateral strips and wherein the cincture structure is made of two layers of cords;

FIGURE 2 is a semi-diagrammatic plan view of the tire casing shown in FIGURE 1, developed in plane, and wherein the various layers of rubber and of cords have been broken away to show the relationship between these layers;

FIGURE 3 is a view similar to FIGURE 1 showing another modification of a tire casing according to the present invention wherein the carcass is formed of a single ply turned about the bead wires and wherein the cincture structure is made of a single layer of cords;

FIGURE 4 is a semi-diagrammatic plan view, similar to FIGURE 2, of the tire shown in FIGURE 3, developed in plane;

FIGURE 5 is a diagrammatic plan view of the ply and the two lateral strips, cut on the bias, and which are used to form a carcass in accordance with the present invention, for example the tire casing shown in FIGURE 1; this ply and these strips are shown as they would be in flat form prior to their incorporation into the carcass.

In FIGURE 1, which represents an embodiment of a tire casing constructed according to the present invention, the carcass of the tire 1 is made of a ply 2 which is cut on the bias and turned about the two bead wires 3 and of two strips 4 which, starting from the bead wires, extend through the tire sidewalls and terminate below the cincture structure; the latter is formed of two layers of cords 5 and 6, whose width is slightly smaller than that of the tread 7. FIGURE 2 represents the central portion of the tire shown in FIGURE 1, developed in plane, from which the tread 7, the two layers 5 and 6 of the cincture structure and the two strips 4 cut on the bias at an angle opposite to that of the ply 2 have been broken away partially to show the relative orientation of all layers.

The cincture structure, formed of two strips 5 and 6 whose cords form with the mid-circumferential plane equal and opposite angles $\alpha$ and $\beta$ having a value of 15°, has a width nearly equal to the width L of the tread 7. The distance $d$ between the ends of the strips 4 below the cincture structure defining the central region of the tire is nearly one half of the width L of the tread 7.

One of the possible alternative embodiments of the present invention is represented in FIGURE 3, which illustrates, in diagrammatic section, a tire caisng 1 in which the cincture structure is composed of a single layer of cords 6 having a width slightly smaller than that of the tread 7; the carcass is composed of a ply 2 cut on the bias which, after being turned about the bead wires 3, reaches with its edges 2' the zone below the cincture structure 6.

FIGURE 4 represents the central portion of the tire shown in FIGURE 3, developed in plane, from which the tread 7, the cincture structure 6 and the turned edges 2' of the ply 2 cut on the bias and constituting the carcass have been partially broken away. The cincture structure is composed of a layer 6 whose cords form with the mid-circumferential plane of the tire an angle $\alpha$ having a value of 12° and whose width is slightly smaller than the width $l$ of the tread 7. The distance $d$ between the ends of the turned edges 2' below the cincture structure 6 and defining the central region of the tire is equal to about 9/10 of the width L of the tread 7.

FIGURE 5 represents the ply and the two strips which can be employed in the carcass of the tires forming the object of the present invention, for example, in the embodiment shown in FIGURES 1 and 2. The ply 2 and the strips 4 are shown in the flat condition as they would appear after cutting and prior to their incorporation in the carcass. It can be noted that the ply 2 is cut on the bias at a cutting angle $\gamma$ and the two strips 4 are also cut on the bias at a cutting angle $\delta$ opposite to $\gamma$. In the particular case of FIGURE 5, the angles $\gamma$ and $\delta$ have the same value, which is equal to 70°; this relationship will impart to the tire the improved characteristic of absence of noise and travelling comfort cited above.

It should be pointed out that the cincture structure must be applied on the carcass after this has been subjected to the shaping operation in order to leave the carcass cords in the central portion free to assume the geodetical path.

Obviously, the invention is not limited to the above described embodiments given by way of example; it should be understood that the present invention also includes other modifications derived from the above described inventive principle.

In particular, the tire casing according to the present invention may be provided with a separate tread, in which case the separate tread may be in the form of a single ring or in the form of a plurality of parallel rings disposed side-by-side.

The cords of the plies and of the carcass strips (where the latter are separately included), as well as those of the cincture structure, can be made of any suitable natural, artificial or synthetic textile material, or of metallic material.

Moreover the materials constituting the plies, the strips and the cincture structure can be the same or different.

What is claimed is:

1. In a pneumatic tire having an outer circumferential tread, and a carcass upon which the tread is supported, said carcass including inner circular beads, sidewalls extending from said beads to said tread, and at least one carcass ply within said carcass extending from bead to bead through said sidewalls and beneath said tread, the improvement wherein said carcass consists of a central region in which the cords of said one carcass ply run along a single non-radial direction and have a geodetical disposition, and of two lateral portions in which the cords form a substantially crossed structure, said lateral portions extending from said beads towards said tread at least as far as the zone of maximum width of the tire; and a substantially inextensible cincture structure situated between said tread and said carcass, said cincture structure having a width not greater than the width of said tread, said cincture structure withstanding the resulting tension stresses and placed under tension by the inflation pressure of the tire.

2. A pneumatic tire as set forth in claim 1, wherein said cincture structure is made of at least one layer of cords inclined at a small angle with respect to the mid-circumferential plane of the tire, said angle being opposite to that of the cords in the central portion.

3. A pneumatic tire as set forth in claim 2, wherein the angle formed by the cords of the cincture structure with respect to the mid-circumferential plane of the tire has a value smaller than 20°.

4. A pneumatic tire as set forth in claim 1 wherein the cords of said one carcass ply intersect the tangents to the circles corresponding to the regions of maximum width of the finished tire at equal and symmetrical angles having a value ranging from 65° to 80°.

5. A pneumatic tire as set forth in claim 1 wherein said tread is separate from said carcass and contains said cincture structure.

6. In a pneumatic tire having an outer circumferential tread, and a carcass upon which the tread is supported, said carcass including inner circular beads, sidewalls extending from said beads to said tread, and at least one carcass ply within said carcass extending from bead to bead through said sidewalls and beneath said thread, the improvement wherein said carcass consists of a central region in which the cords of said one ply run along a single non-radial direction and have a geodetical disposition, and of two lateral portions in which the cords form a substantially crossed structure; and a substantially inextensible cincture structure situated between said tread and said carcass, said cincture structure having a width not greater than the width of said tread, said cincture structure withstanding the resulting tension stresses and placed under tension by the inflation pressure of the tire; said lateral portions extending from said beads towards said tread as far as a zone below the cincture structure, a gap being left in the central region of said carcass between the edges of said lateral portions which is not smaller than ⅓ of the width of the tread.

References Cited in the file of this patent

UNITED STATES PATENTS

| | | |
|---|---|---|
| 2,493,614 | Bourdon | Jan. 3, 1950 |
| 2,700,998 | Wallace | Feb. 1, 1955 |
| 2,811,191 | Comstock | Oct. 29, 1957 |
| 2,826,233 | Cooper | Mar. 11, 1958 |
| 2,895,525 | Lugli | July 21, 1959 |

FOREIGN PATENTS

| | | |
|---|---|---|
| 1,088,973 | France | Sept. 22, 1954 |
| 786,162 | Great Britain | Nov. 13, 1957 |

UNITED STATES PATENT OFFICE
CERTIFICATE OF CORRECTION

Patent No. 3,058,509                      October 16, 1962

Luigi Maiocchi

It is hereby certified that error appears in the above numbered patent requiring correction and that the said Letters Patent should read as corrected below.

Column 2, line 23, for "is" read -- it --; line 31, for "consequtnce" read -- consequence --; column 3, line 56, for "miximum" read -- maximum --; line 58, for "bejtween" read -- between --; column 5, line 45, for "caisng" read -- casing --; column 6, line 67, for "thread" read -- tread --.

Signed and sealed this 26th day of February 1963.

(SEAL)
Attest:

ESTON G. JOHNSON                          DAVID L. LADD

Attesting Officer                            Commissioner of Patents